(No Model.) 3 Sheets—Sheet 1.

G. M. WESTMAN.
PROCESS OF REDUCING ZINC ORES.

No. 383,202. Patented May 22, 1888.

WITNESSES:
Chas. Nida.
C. Sedgwick.

INVENTOR:
G. M. Westman
BY Munn & Co.
ATTORNEYS.

(No Model.) 3 Sheets—Sheet 3.

G. M. WESTMAN.
PROCESS OF REDUCING ZINC ORES.

No. 383,202. Patented May 22, 1888.

WITNESSES:
Chas. Nida
C. Sedgwick

INVENTOR:
G. M. Westman
BY Munn & Co.
ATTORNEYS.

N. PETERS, Photo-Lithographer, Washington, D. C.

UNITED STATES PATENT OFFICE.

GUSTAF M. WESTMAN, OF NEW YORK, N. Y.

PROCESS OF REDUCING ZINC ORES.

SPECIFICATION forming part of Letters Patent No. 383,202, dated May 22, 1888.

Application filed October 21, 1887. Serial No. 252,974. (No model.)

*To all whom it may concern:*

Be it known that I, GUSTAF M. WESTMAN, a subject of the King of Sweden, at present residing in the city, county, and State of New York, have invented a new and Improved Process of Reducing Zinc Ores, of which the following is a full, clear, and exact description.

The object of my invention is to provide a new and improved process of completely reducing zinc ores at a very low cost with the saving of labor and fuel.

My improved process of reducing zinc ores consists in heating the zinc ores in mixture with coal by means of externally-heated continually-circulating carbonic-oxide gas.

Reference is to be had to the accompanying drawings, illustrating special means for carrying the process into effect, and in which similar letters of reference indicate corresponding parts in all the figures.

Figure 1:
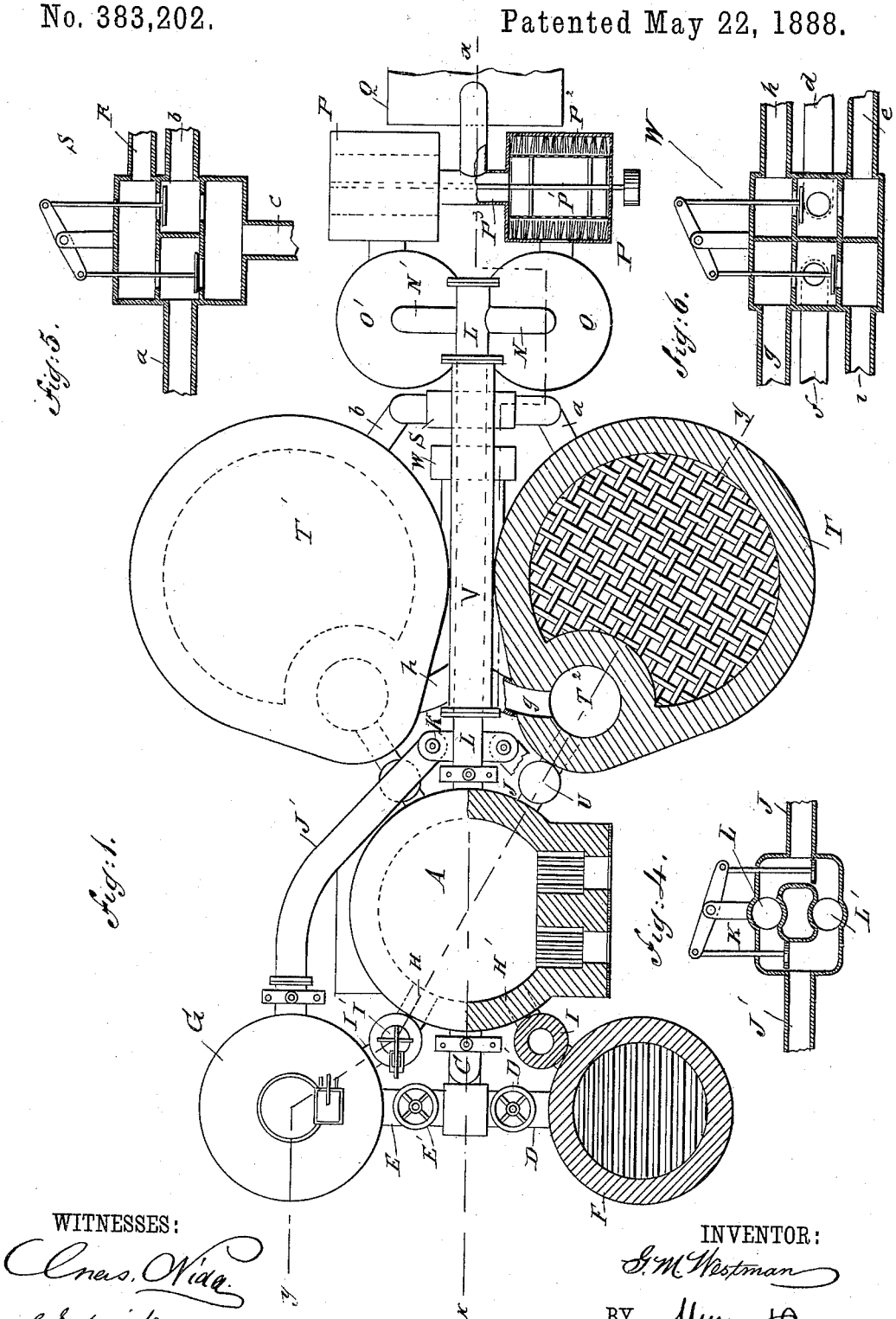
Figure 2:
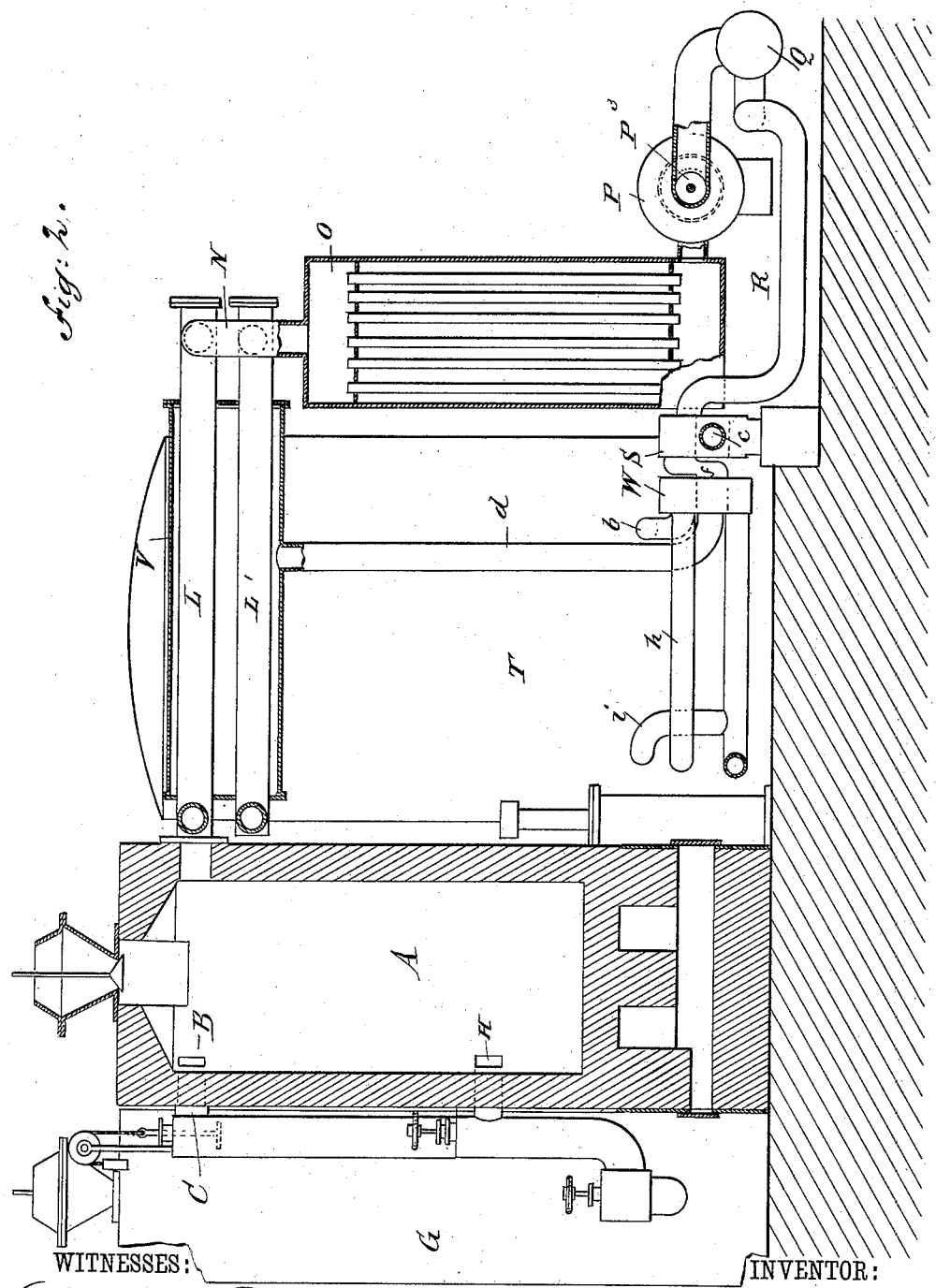
Figure 3:
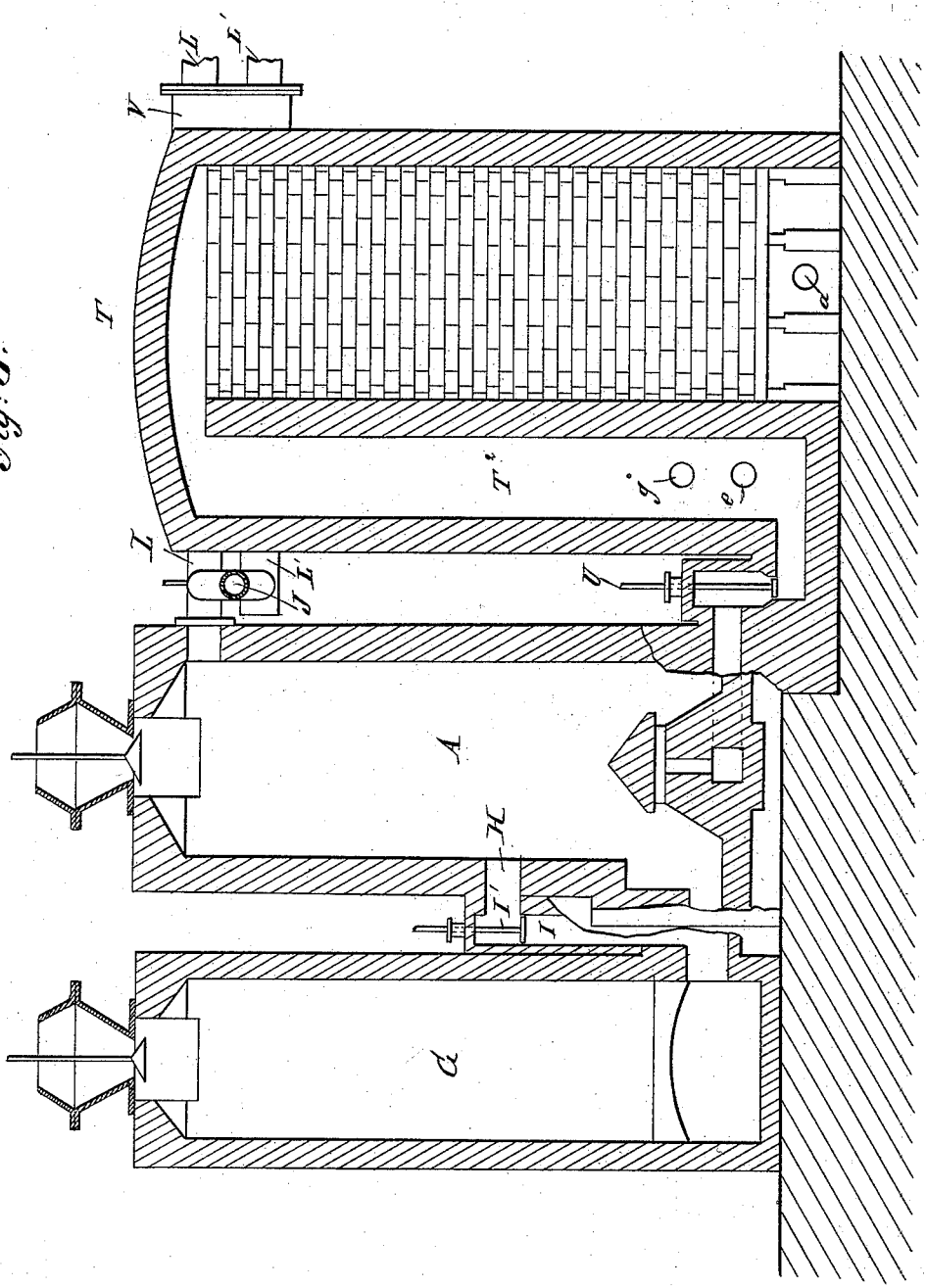

Figure 1 is a plan view, partly in section, of the furnace for carrying out my improvement. Fig. 2 is a longitudinal sectional elevation of the same on the line $x\,x$ of Fig. 1. Fig. 3 is a like view of the same on the line $y\,y$ of Fig. 1; and Figs. 4, 5, and 6 are sectional views of the valves for connecting various pipes, hereinafter more fully described.

My improved process above described is preferably carried into effect by the apparatus presently to be described.

In the reducing-furnace A, of any approved construction, are placed the zinc ores to be treated, mixed with a suitable quantity of coal. In the upper end of the reducing-furnace A is formed an aperture, B, leading to a pipe, C, extending downward and branching into pipes D and E, each provided with a valve, D' or E', respectively. The pipes D and E lead into the bottom of the condensing-furnaces F and G, respectively, which are alike in construction, each being filled with a filling material, such as coke, &c. In the lower end of the reducing-furnace A are formed apertures H H', leading to the channels I I, connecting with the bottom of the condensing-furnaces F and G, respectively, each of the channels I being provided with a valve, I', for closing the connection between the reducing-furnace A and the respective condensing-furnaces F or G.

From the top of the condensing-furnaces F and G lead the pipes J and J', respectively, to a valve, K, (illustrated in Fig. 4,) and arranged in such a manner that the two pipes J and J' can discharge in either of the two pipes L and L'. The pipe L is also connected with the top of the reducing-furnace A, as shown in Fig. 2. The pipe L is connected at its outer end by a branch pipe, N, with the cooler O, and the pipe L' is similarly connected by a pipe, N', with the cooler O'.

The coolers O and O' may be of any approved construction, preferably, however, provided with a cooling-chamber, through which the atmospheric air or water passes, as shown in Fig. 2. The gases passing through the coolers O and O' pass through pipes surrounded by the cool atmospheric air or water. Each of the coolers O and O' discharges into a separator, P, provided with a revolving sieve, P', made of cloth or other suitable material, and mounted on a shaft receiving a rotary motion in any suitable manner. Against the cloth is held a brush, $P^2$, secured to the shell of the separator, so that the gases passing into the separator from the coolers O and O' are separated from impurities by passing through the cloth into the interior of the sieve, and the impurities are brushed off from the outside by the brush $P^2$.

The interiors of the sieves P' connect with a pipe, $P^3$, leading into a circulating blast-engine, Q, of any approved construction. The engine Q discharges into a pipe, R, connected with the valve S, (shown in detail in Fig. 5,) and provided with the pipes $a$ and $b$, leading to the bottoms of the regenerators T and T', respectively. The valve S is also provided with a pipe, $c$, leading to the chimney. The pipes R, $a$, $b$, and $c$ are so arranged that the blast from the engine can pass either to the regenerator T by means of the pipe $a$ or to the regenerator T' by means of the pipe $b$, and while one of the regenerators is connected with the pipe R the other regenerator is connected by its respective pipe with the pipe $c$, leading to the chimney, as is plainly understood by reference to Fig. 5, to carry off the products of combustion.

Each of the regenerators T and T' is provided with a channel, $T^2$, connected with the top of the interior of the regenerator and leading into the bottom of the reducing-furnace A. The valve U, located in the channel $T^2$, serves to connect or disconnect the respective regenerator with or from the reducing-furnace A.

The pipes L and L' are surrounded by a jacket, V, having an opening in its rim or in one of its heads leading to the outside. A pipe, $d$, leads from the jacket V downward and connects with a valve, W, located near the valve S, and provided with pipes $g$ and $e$, leading to the regenerator T, and also provided with pipes $h$ and $i$, leading to the regenerator T'. A pipe, $f$, leads from the valve W to the valve S, so as to draw off any surplus gas not discharged by said valve to the respective regenerator. The valve W is so arranged that the air passing from the jacket V to the pipe $d$ and the surplus gas from the valve S can be discharged in either of the regenerators T or T' to be burned.

As shown in Fig. 6, the air from the pipe $d$ passes into the pipe $e$, leading to the channel $T^2$ of the regenerator T, and the surplus gas entering through the pipe $f$ passes to the same channel, $T^2$, of the regenerator by means of the pipe $g$. If the valve is reversed, the air entering the pipe $d$ can pass through the pipe $h$ into the channel $T^2$ of the regenerator T', and the gas entering through the pipe $f$ can pass by the pipe $i$ into the same channel, $T^2$, of the regenerator T'.

The operation is as follows: When one regenerator, T or T', is connected with the reducing-furnace A, the other regenerator is closed to the said reducing-furnace by the valve U. The reducing-furnace A is thus supplied with carbonic-oxide gas heated in the regenerator T, and the gases now arising in the reducing-furnace can either be taken off at the top through the opening B or through the opening H near the lower end of said reducing-furnace. When the opening B is connected with the condensing-furnace G, the valve D' in the pipe D is closed, while the valve E' in the pipe E is opened, thus establishing a connection from the opening B through the pipe C and the pipe E with the condensing-furnace G. The valve I' in the channel I connecting the reducing-furnace A with said condensing-furnace G is now closed, while the valve I' in the channel leading from the reducing-furnace A to the condensing-furnace F is open, so that the highly-heated gases in the bottom of the reducing-furnace A pass through the aperture H into the condensing-furnace F, while the gases of a lower temperature in the top of the reducing-furnace A pass through the opening B into the condensing-furnace G. Thus the condensing-furnace F is in operation to condense the zinc vapors, while the other furnace, G, is cooled off by the waste gases coming from the top of the reducing-furnace A.

The arrangement just described can be reversed by closing the valve E' in the pipe E and opening the valve D' in the pipe D, and by closing the valve I' in the channel I leading from the reducing-furnace A into the condensing-furnace F, and by opening the valve I' in the channel I leading from the reducing-furnace A into the condensing-furnace G. In this case the zinc vapors are condensed in the condensing-furnace G, while the condensing-furnace F is cooled off by the gases of a lower temperature coming from the top of the reducing-furnace A. The gases after passing through the respective condensing-furnace F or G pass into the pipes J and J', and by means of the valve K are directed into the pipes L and L', leading from said valve K. The air passing through the jacket V, surrounding said pipes L and L', partly cools the gases passing through the pipes L and L'.

The gases from the pipes L and L' pass into the coolers O and O' and are still more reduced to a lower temperature and then pass into the separators P, in which the gases are separated from the impurities, cinders, &c., which are carried off with the gases from the condensing-furnaces F and G. The gases are then drawn into the circulating blast-furnace Q, which discharges through the pipe R into the valve S, from which the gases are led into the respective regenerator T or T' used for supplying reducing-furnace A with heated and carbureted gas.

The other regenerator, T', which is not connected with the reducing-furnace A, is used for burning the surplus gases which pass from the valve S into the valve W, and from the latter, with a sufficient mixture of air entering through the pipe $d$, pass into the channel $T^2$ of the other regenerator, to be burned in the usual manner. It will be seen that either of the regenerators T and T' can be used for supplying heated carbonic-oxide gas to the reducing-furnace A, while at the same time the other regenerator not used for this purpose is employed to burn the surplus gases.

It will further be seen that a continuous stream of gases passes through the reducing-furnace, the condensers, the coolers, separators, blasting-engine, and regenerators, and the said gases are used over and over again for condensing and for supplying the necessary heat in reducing.

In defining my invention with greater clearness I would state that in the reduction of zinc ores it is not only necessary that the gases should convey heat enough for the operation, but also that they should be absolutely free from oxidizing matters. Ordinary producer-gases made through introducing air into coal cannot be free from carbonic acid.

In the circulating gases that I intend to use the oxygen is taken from the zinc oxide and the carbon from the fuel, and, as herein described, I avoid the admixture of air or oxygen with the gas. The solid carbon mixed with the zinc ore acts as the reducing agent. The reduction of zinc oxide cannot be effected by means of carbonic oxide alone, a fact that is practically demonstrated by the oxidation of zinc when heated in contact with carbonic acid, ($CO_2$,) and theoretically by the greater amount of heat developed by the combustion of zinc than by the combustion of carbonic oxide with the same quantity of oxygen. Moreover, when no air is introduced in the furnace, a chemical change of the gases cannot take place, and thus the only object of the carbonic-oxide gas is to introduce from the outside the heat necessary to the reducing operation, which consequently is of the most material importance in my process.

Having thus fully described my invention, I claim as new and desire to secure by Letters Patent—

The herein-described process of reducing zinc ores, consisting of subjecting the zinc ores in mixture with coal to the action of highly-heated carbonic oxide, condensing the zinc from the outgoing carbonic oxide, and subsequently reheating and returning the gas through the charge, substantially as shown and described.

GUSTAF M. WESTMAN.

Witnesses:
 THEO. G. HOSTER,
 C. SEDGWICK.